(No Model.)
W. HOLLOWAY.
TWO WHEELED VEHICLE.
No. 393,234. Patented Nov. 20, 1888.
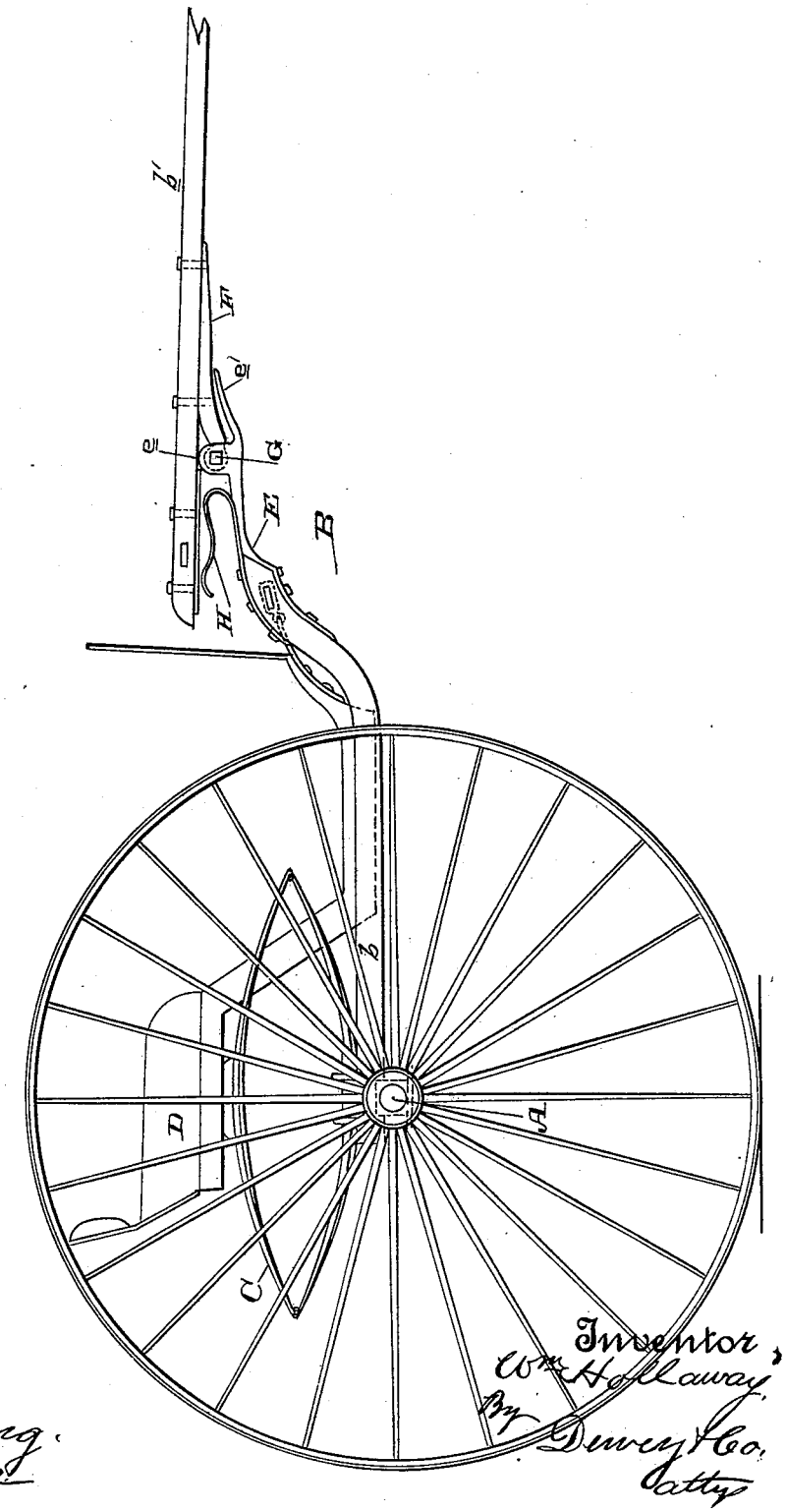
Witnesses,
Geo. H. Strong.
J. H. Towne
Inventor,
Wm. Holloway,
By Dewey & Co.
Atty

UNITED STATES PATENT OFFICE.

WILLIAM HOLLAWAY, OF GILROY, CALIFORNIA.

TWO-WHEELED VEHICLE.

SPECIFICATION forming part of Letters Patent No. 393,234, dated November 20, 1888.

Application filed August 10, 1888. Serial No. 282,463. (No model.)

*To all whom it may concern:*

Be it known that I, WILLIAM HOLLAWAY, of Gilroy, in the county of Santa Clara and State of California, have invented an Improvement in Two-Wheeled Vehicles; and I hereby declare the following to be a full, clear, and exact description thereof.

My invention relates to that class of two-wheeled vehicles commonly known as carts; and my invention consists in the novel shaft-connection, hereinafter fully described and illustrated in the accompanying drawings, in which the figure is a side elevation of a cart showing my invention.

The object of my invention is to so connect the shafts that their up-and-down motion, due to the jogging of the horse, shall not be communicated to the body of the vehicle, whereby the cart is rendered comfortable and easy riding.

A is the axle.

B is the shaft, made in two sections, $b$ and $b'$.

C is the spring, and D is the body.

The rear section of the shaft and the spring are clipped solidly to the axle, and the body is mounted on the spring in the usual manner.

The sections of the shaft are jointed together by the following connections: Bolted under the forward end of the rear section is a strap-iron, E, having near its forward end ears or lugs $e$, and beyond said ears or lugs the limiting-stop $e'$. Bolted under the forward section of the shaft is the shaft-iron F, the rear end of which passes over the limiting-stop $e'$ of the strap-iron E and fits between the ears or lugs $e$ of said iron, being hinged or pivoted therein by a bolt, G. By this construction it will be seen that the forward section of the shaft has a hinged connection with the rear section, and is movable about said hinge, being limited, however, in its movement in one direction by the stop $e'$. Bolted to the upper surface of the forward end of the rear section of the shaft is a spring, H, the upper leaf or portion of which bears under the rear end of the forward section of the shaft, its lower portion or shaft bearing on the strap-iron E. This spring limits the movement of the forward section of the shaft in the other direction. It will now be seen that said forward section of the shaft is enabled to have its necessary up-and-down movement, due to the jogging of the horse, this motion being confined, however, between the limits on the one side by the stop $e'$ and on the other by the spring H; but the said movement is not communicated to the rear section of the shaft, therefore the body of the vehicle has not imparted to it that forward and back motion which is so unpleasant in this class of vehicles.

By the overlapping arrangement of the two sections of the shaft and the location of the spring H between their overlapping ends it will be seen that any tendency toward a communication of motion from the forward to the rear section is in effect counteracted, for the reason that the forward section, being pivoted at the point shown, causes that portion of said section which is back of the pivot-point to move down, while that portion of said section which is forward of said pivot-point is moved up, and this avoids any tendency to lift the rear section of the shaft.

It is obvious that instead of the spring H here shown other forms of springs may be used, which, by being located in substantially the same position, will effect a similar result; and it is also obvious that the rear section of the shaft need not necessarily be a shaft proper, but might in some constructions of carts be a portion of the frame of the cart, while the shaft proper might be regarded as equivalent to what is here shown as the forward section.

Having thus described my invention, what I claim as new, and desire to secure by Letters Patent, is—

In a two-wheeled vehicle, the combination, with the frame of the vehicle, of the rear section of the shaft having the strap-iron E bolted under the forward end thereof, said iron being provided with ears $e$ and forwardly-projecting limiting-stop $e'$, the shaft-iron F, bolted under the forward section of the shaft and passing over the limiting stop to the ears $e$, between which it is hinged or pivoted, and a spring, H, between the sections of the shaft, substantially as herein described.

In witness whereof I have hereunto set my hand.

WILLIAM HOLLAWAY.

Witnesses:
S. H. NOURSE,
H. C. LEE.